US008745268B2

(12) United States Patent
Doggett

(10) Patent No.: US 8,745,268 B2
(45) Date of Patent: Jun. 3, 2014

(54) IN-LINE SECURITY DEVICE

(75) Inventor: David Doggett, Arlington, MA (US)

(73) Assignee: Schneider Electric USA, Inc., Palatine, IL (US)

( * ) Notice: Subject to any disclaimer, the term of this patent is extended or adjusted under 35 U.S.C. 154(b) by 743 days.

(21) Appl. No.: 12/193,495

(22) Filed: Aug. 18, 2008

(65) Prior Publication Data
US 2010/0042689 A1  Feb. 18, 2010

(51) Int. Cl.
G06F 15/16  (2006.01)
(52) U.S. Cl.
USPC .......................................................... 709/245
(58) Field of Classification Search
USPC .......................................................... 709/245
See application file for complete search history.

(56) References Cited

U.S. PATENT DOCUMENTS

| 7,246,156 | B2 * | 7/2007 | Ginter et al. | 709/217 |
| 2005/0021649 | A1 * | 1/2005 | Goodman et al. | 709/207 |
| 2009/0307320 | A1 * | 12/2009 | Golan et al. | 709/206 |

* cited by examiner

Primary Examiner — Maceeh Anwari
(74) Attorney, Agent, or Firm — Banner & Witcoff, Ltd.

(57) ABSTRACT

Aspects of the invention provide apparatuses, systems, and computer readable media for providing security to an end device (209) by a security device (205). The security device is typically installed in front of the end device. The combination of the end device and the security device appear as a single secure end device from the network having a network address of the original end device. The security device may include a first communications port (405) that receives a message designated for an end device, a second communications port (407) that connects directly to the end device, and a processor (401) that is connected to the first and second communications ports. The processor is configured to determine whether to pass the message to the end device based on at least one security consideration and to provide at least one service that is not originally supported on the end device.

22 Claims, 4 Drawing Sheets

IN-LINE SECURITY DEVICE

BACKGROUND

A system, which monitors or controls a manufacturing plant, may be used to perform a variety of different tasks and may include different end devices that were designed without sufficient security mechanisms. For example, an industrial network of computer systems and components may be used in controlling and/or monitoring industrial systems. Such industrial systems can be used in connection with manufacturing, power generation, energy distribution, waste handling, transportation, telecommunications, and water treatment. The industrial network may be connected and accessible through other networks, both directly and indirectly, including a corporate network and the Internet. The industrial network may thus be susceptible to both internal and external cyber-attacks and non-intentional actions that still disrupt the performance/operation of the system. As a preventive measure from external cyber-attacks, firewalls or other security measures may be taken to separate the industrial network from other networks. However, the industrial network is still vulnerable since such security measures are not foolproof in the prevention of external attacks by viruses, worms, Trojans and other forms of malicious code as well as computer hacking, intrusions, insider attacks, errors, and omissions may occur. Additionally, an infected laptop, for example, can bypass the firewall by connecting to the industrial network using a modem, direct connection, or by a virtual private network (VPN). The laptop may then introduce worms or other forms of malicious code into the industrial network. Moreover, a laptop may be connected directly to the network behind the firewall.

One approach, in accordance with prior art, is to monitor events of the industrial network and accordingly raise alerts. The industrial network may perform a threat assessment and respond in accordance with the threat assessment. A wide variety of conditions relating to performance, health and security information about the industrial network as well as other factors reflecting conditions external to the industrial network may be taken into account. However, the monitoring of alarms is an alert capability that can be used to trigger actions to prevent access but, by itself, does not prevent access.

Many industrial Ethernet end devices have very little or no security because either the end devices were designed and deployed before security was an issue or because the end devices are based on limited resources and security was not included in the design. Consequently, a security device is needed that provides sufficient security for each end device in an industrial network by protecting existing devices that are currently installed as well as new devices that lack needed security features.

SUMMARY

An aspect of the invention provides apparatuses, computer-readable media, and systems for providing security to an end device by a security device that interfaces to a network. The security device is typically installed in front of the end device through a network cable. The combination of the end device and the security device appear as a single secure end device from the network having a network address of the original end device.

With another aspect of the invention, a security device includes a first communications port that receives a message (which may comprise one or more packets) designated for an end device, a second communications port that connects directly to the end device, and a processor that is connected to the first and second communications ports. The processor is configured to determine whether to pass the message to the end device based on at least one security consideration through the second communications port and to provide at least one service that is not originally supported on the end device.

With another aspect of the invention, when a message is associated with the at least one service not originally supported on the end device, a security device may provide the service by exchanging data with the end device using a native protocol of the end device, converting the data to a required protocol, and returning a response to a sender of the message.

With another aspect of the invention, a security device utilizes different security actions based on the request type of a received message and/or identification of the sender.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein.

DETAILED DESCRIPTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
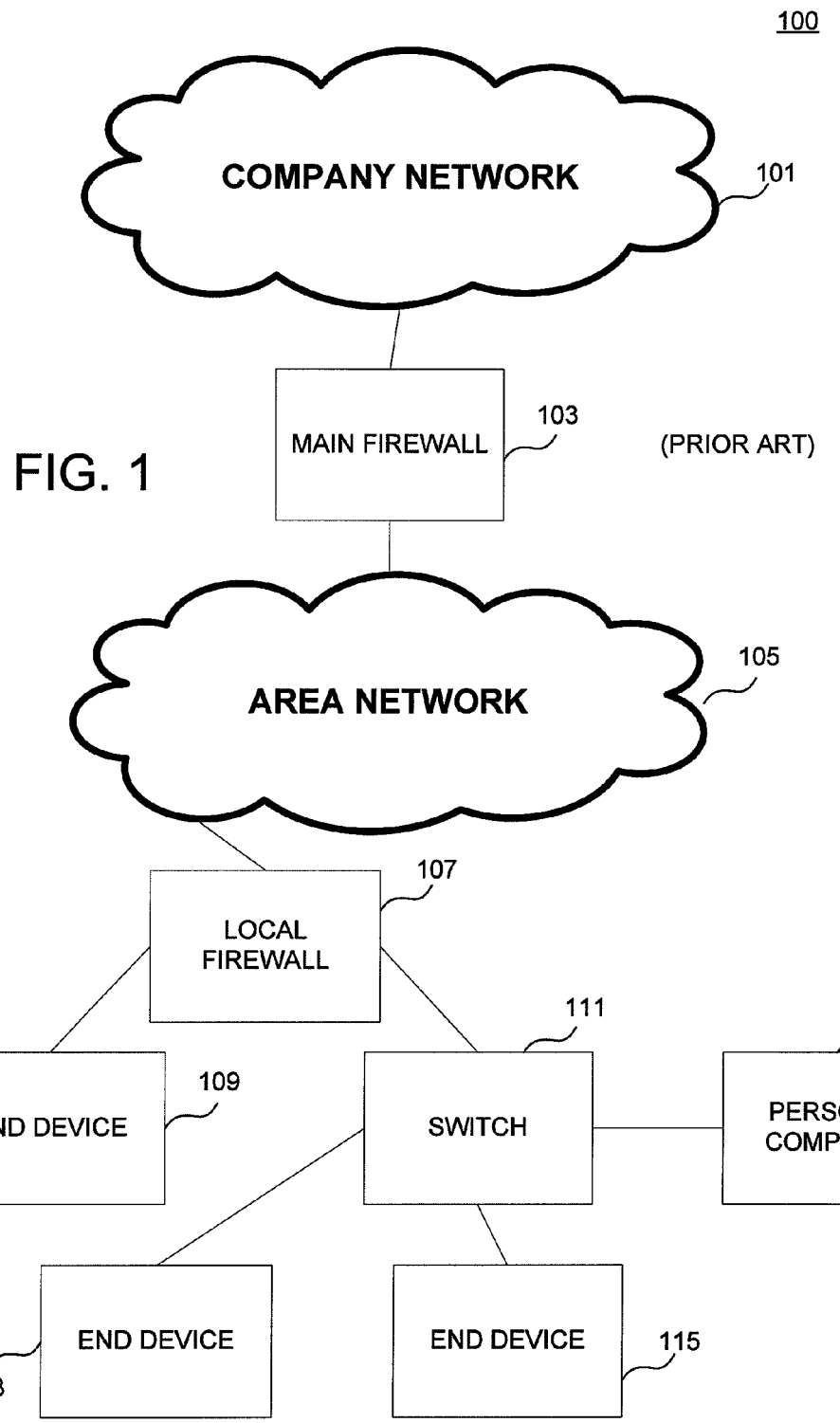
FIG. 1 shows a system connected to a network and providing security measures in accordance with prior art.

FIG. 1 shows system 100 connected to networks 101 and 105 and providing security measures in accordance with prior art. Industrial Ethernet end device 109 and end devices 113 and 115 (through switch 111) may have very little or no security. For example, personal computer 117 may be able to access end devices 113 and 115 without any restriction or protection. Often the end devices were designed and deployed before security was an issue or because the design of the end devices was based on limited resources and security.

Main firewall 103 provides a level of security by regulating the flow of traffic between company network 101 and area network 105 while local firewall 107 regulates traffic from area network 105 to groups of end devices. (A firewall is typically a dedicated appliance, or software running on another computer, which inspects network traffic passing through it, and denies or permits passage based on a set of rules. A firewall's basic task is typically to regulate some of the flow of traffic between computer networks of different trust levels.)

However, firewalls 103 and 107 117 typically are separate entities with respect to end devices 109, 113, and 115 and thus require separate setup and management. Without proper configuration, the benefits provided by firewalls 103 and 107 may be reduced. Standard security practices dictate a "default-deny" firewall rule set, in which the only network connections which are allowed are the ones that have been explicitly allowed. Unfortunately, such a configuration requires detailed understanding of the network applications and endpoints required for the organization's day-to-day operation. Businesses often lack such understanding, and therefore implement a "default-allow" rule set, in which all traffic is allowed unless it has been specifically blocked. This configuration makes inadvertent network connections and system compromise much more likely.

Firewalls 103 and 107 may select a firewall configuration based on a threat level indicator. The firewall configuration may be selected from a plurality of firewall configurations, in which each is associated with a different threat level indicator. A first firewall configuration associated with a first threat level indicator may provide for more restrictive connectivity with a network than a second firewall configuration associated with a second threat level indicator, where the first threat level indicator has a higher threat level than the second threat level indicator. A firewall configuration associated with a highest threat level indicator may provide for disconnecting the network from all other less-trusted networks. The disconnecting may include physically disconnecting the network from other networks. The network may be reconnected to less trusted networks when a current threat level has a level other than the highest threat level indicator. The threat level indicator may be determined from a manual input or from one or more metrics.

Firewalls 103 or 107 typically functions as a security product in industrial applications and is intended as a border security device to protect an entire network and to monitor the network to detect intrusion.

Figure 2:
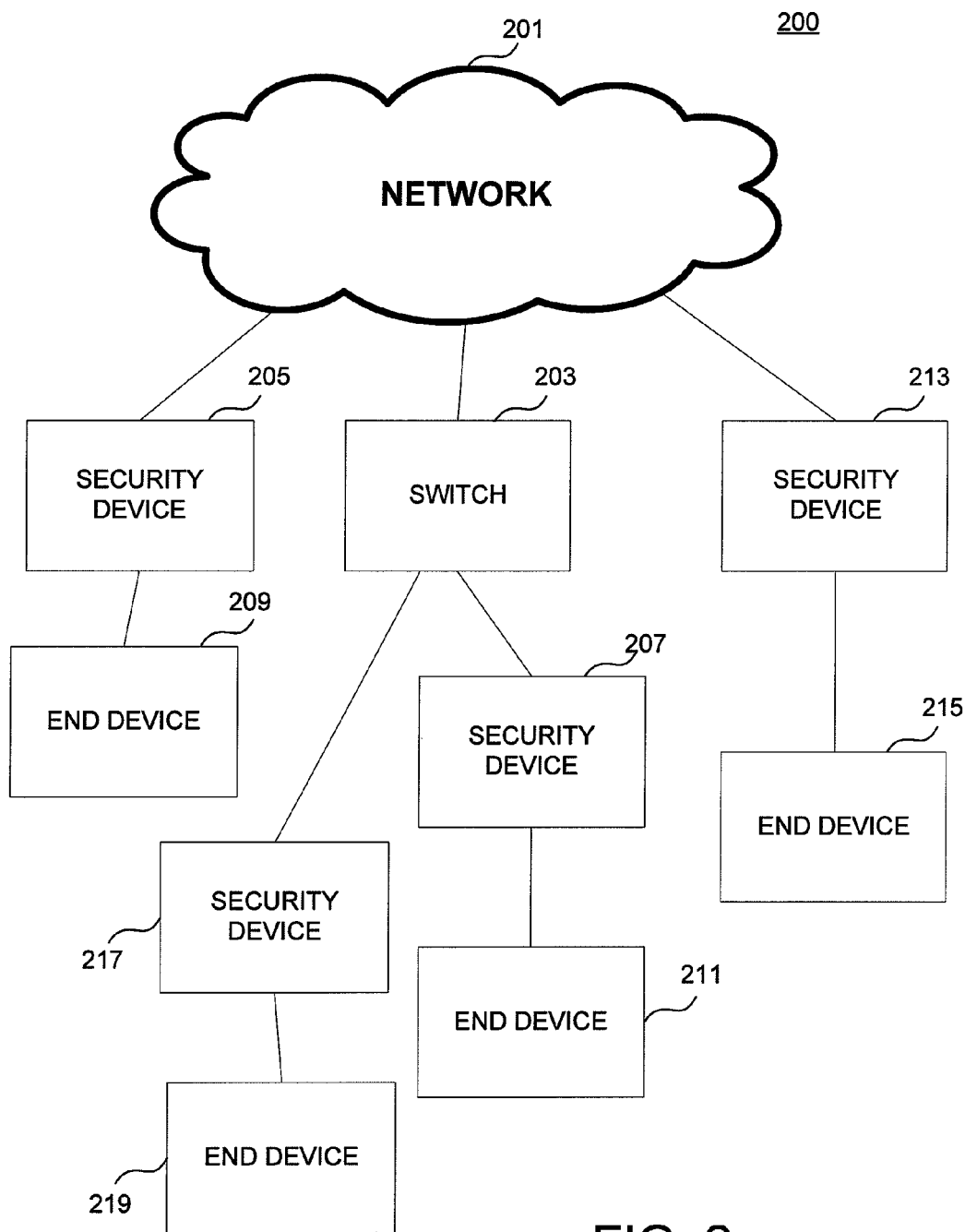
FIG. 2 shows a system connected to a network and providing security measures according to an embodiment of the invention.

FIG. 2 shows system 200 connected to network 201 and providing security measures according to an embodiment of the invention. A security device is installed directly in front of an end device to provide security for the end device and to make the combination of the two devices (end device plus inline security device) appear to the outside world as a single secure end device. For example, security devices 205, 207, 213, and 217 are installed in front of end devices 209, 211, 215, and 219, respectively. A security device may directly connect to network 201 (e.g., security devices 205 and 213) or may indirectly connect network 201 (e.g., security devices 207 and 217 through switch 203).

Referring to FIG. 1, local firewall 107 provides security for a plurality of end devices and typically monitors a network to detect intrusion. Local firewall 107 is typically designed for network border protection and appears on network 105 as an end device in it's own right and consequently is administered as a separate device. Moreover, local firewall 107 may be unable to provide individual protection to an end device (e.g., end device 115) from an attack that is launched on the network between local firewall 107 and the end device.

Referring back to FIG. 2, an end device and an associated security device (e.g., security device 213 plus end device 215) appear as a single entity to network 201, where a security device is typically designed to protect a single end device. With an embodiment of the invention, security device 213 protects only a single end device (i.e., end device 215) to provide an inexpensive device to be used for the security product. Because a security device is positioned directly at an individual end device, the security device is able to protect the end device from an attack exterior to the network as well as within the network.

Figure 4:
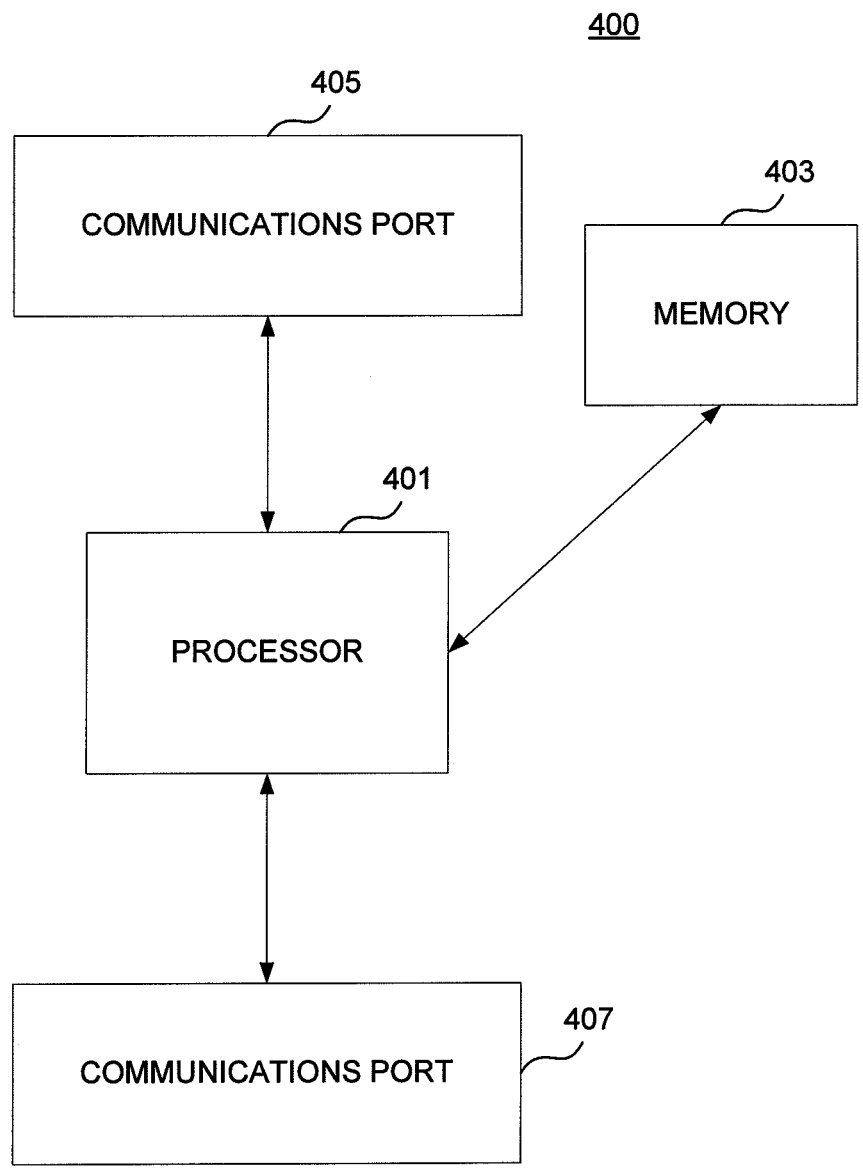
FIG. 4 shows a block diagram of a security device according to an embodiment of the invention.

With an embodiment of the invention, a security device is a cost-effective dual port device (e.g., security device 400 as shown in FIG. 4 that will be discussed) mounted to the associated end device by unplugging an Ethernet cable from the end device and into the security device. A short cable is then used to link the end device back into the security device effectively patching the end device back into the network 201.

The security device assumes the IP address of the end device and acts as a proxy server for the services of the end device, thus hiding the end device from outside attack and allowing security checks to be made on messages destined for the end device. The security device may support an industrial application protocol (e.g., Modbus, XWAY and Unity) and can be configured to permit or deny access to the associated end device depending on where/who and what the incoming request is. Embodiments of the invention may also support non-industrial protocols, including FTP, HTTP, and SNMP. For example, the end device's FTP server may be accessed only to authorized IP addresses or passwords to allow firmware upgrades or data retrieval. Also, data access may be allowed but programming access is permitted only with a challenge password.

The security device may also provide additional services that are not directly supported by the end device. Exemplary services include Simple Network Management Protocol (SNMP), web pages, and e-mail (e.g., Simple Mail Transfer Protocol (SMTP)). With such services, data is exchanged between the security device and the end device using a protocol native to the end device. The exchanged data is converted to the required protocol by the security device. However, one skilled in the art would appreciate design considerations related to required delay/processing power. More proxy services that are added to the security device typically require more memory and processor speed.

A security device (e.g., device 215) may support a SNMP service forming part of the internet protocol suite as defined by the Internet Engineering Task Force (IETF). SNMP is typically used in network management systems to monitor network-attached devices for conditions that warrant administrative attention. SNMP consists of a set of standards for network management, including an Application Layer protocol, a database schema, and a set of data objects. SNMP exposes management data in the form of variables on the managed systems, which describe the system configuration. These variables can then be queried (and sometimes set) by managing applications.

In typical SNMP usage, there are a number of systems to be managed, and one or more systems managing them. A software component called an agent runs on each managed system and reports information via SNMP to the managing systems.

SNMP agents expose management data on the managed systems as variables (such as "free memory", "system name", "number of running processes", "default route"). The managing system can retrieve the information through the GET, GETNEXT and GETBULK protocol operations or the agent will send data without being asked using TRAP or INFORM protocol operations. Management systems can also send configuration updates or controlling requests through the SET protocol operation to actively manage a system. Configuration and control operations are used only when changes are needed to the network infrastructure. The monitoring operations are usually performed on a regular basis.

The security device may also support a SMTP service, which is the defacto standard for e-mail transmissions across the Internet. Formally SMTP is defined in RFC 821 (Internet Engineering Task Force, "Simple Mail Transfer Protocol) as amended by RFC 1123 (Internet Engineering Task Force, "Requirements for Internet Hosts—Application and Support," STD 3, chapter 5). The protocol currently used is also known as Extended SMTP (ESMTP) and is defined in RFC 2821 (Internet Engineering Task Force, "Simple Mail Transfer Protocol").

SMTP is a text-based protocol, in which one or more recipients of a message are specified (and in most cases verified to exist) along with the message text and possibly other encoded objects. The message is then transferred to a remote server using a procedure of queries and responses between the client and server. Either an end-user's email client, a.k.a. MUA (Mail User Agent), or a relaying server's MTA (Mail Transport Agents) can act as an SMTP client.

An email client knows the outgoing mail SMTP server from its configuration. A relaying server typically determines which SMTP server to connect to by looking up the MX (Mail eXchange) DNS record for each recipient's domain name (the part of the email address to the right of the at (@) sign). Conformant MTA's typically fall back to a simple "A" record in the case of no MX. (Relaying servers can also be configured to use a smart host.)

The SMTP client initiates a TCP connection to server's port 25 (unless overridden by configuration). SMTP is a "push" protocol that does not allow one to "pull" messages from a remote server on demand. To do this, a mail client typically uses Post Office Protocol version 3 (POP3) or Internet Message Access Protocol (IMAP). Another SMTP server may trigger a delivery in SMTP using Extended Turn (ETRN) as defined in RFC 1985.

While embodiments of the invention may support additional features at the security device as described herein, an end device can be redesigned to include additional features (services) with other embodiments of the invention. However, redesign of an end device to support an additional feature typically requires a hardware redesign and hence replacement of the physical end device with an associated cost. Alternatively, embodiments of the invention may incorporate a full firewall plus proxy server plus protocol bridges that can be installed in front of every end device along with a switch. However, this approach typically requires a large amount of cabinet space in order for the user to manage new end devices (as the firewall, proxy server and each bridge typically appear as extra end devices). Moreover, the resulting system may not provide industrial application layer services.

Figure 3:
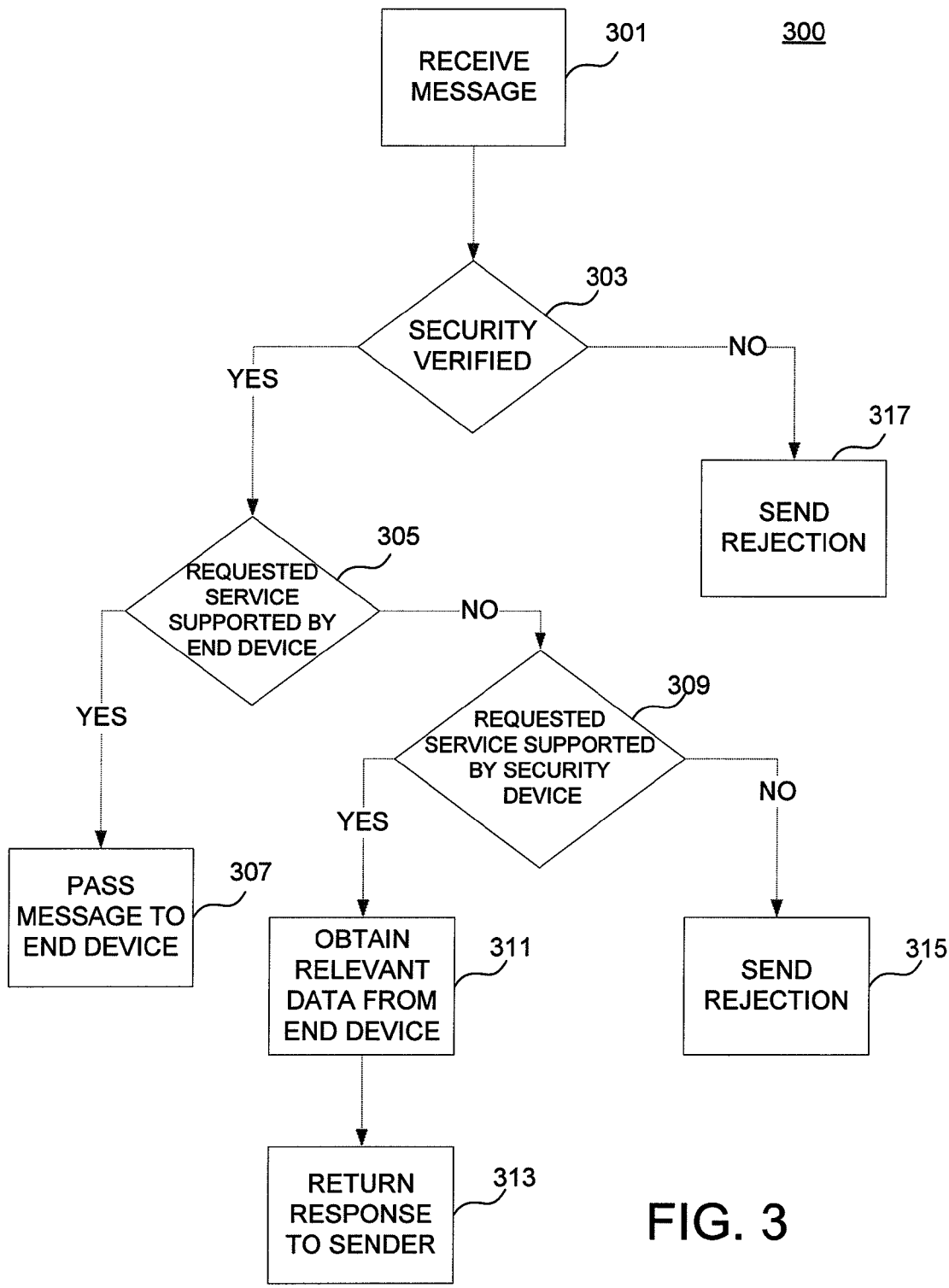
FIG. 3 shows a flow diagram for a security device according to an embodiment of the invention.

FIG. 3 shows flow diagram 300 for a security device according to an embodiment of the invention. In step 301, a security device receives a message from network 201 with a destination address originally assigned to the associated end device. In step 303, the security device determines if the sender has security privileges for the requested service (which may be supported either on the security device or on the associated end device). For example, data access may be allowed for all incoming requests but programming access is permitted only with a challenge password. If security is not verified for the incoming message, the security device sends a response message denying service in step 317. Otherwise, the security device proceeds to process the request in step 305.

If step 305 determines that the requested service is supported by the end device, the message is passed to the end device in step 307. Otherwise, the security device determines if the requested service is supported by the security device in step 309. If not, the security device sends a response message that rejects the request in message 315. Otherwise, the security device queries the end device using a native protocol and obtains relevant data from the end device in step 311. As an example, a request via SNMP may be received that asks for data about the current device type and IP parameters of the end device. The end device does not support SNMP but the proxy can send a Modbus request to the end device to gather this information using the Modbus protocol using the appropriate Modbus function codes. After the information is returned, the security device formats the data into a SNMP reply and answers the requestor. To the requester, it appears that the end device supports the SNMP request. When the data has been obtained from the end device, the security device sends a response message in step 313.

FIG. 4 shows a block diagram of security device 400 according to an embodiment of the invention. Security device 400 interfaces with the network through communications port 405 and with the end device through communications port 407. Security device 400 may have processor 401 for controlling overall operation of the computing device and its associated components, including memory 403 and communications ports 405 and 407.

Communications ports 405 and 407 may be compatible with standard Ethernet protocols, including User Datagram Protocol (UDP) and Internet Protocol (IP). However, embodiments of the invention may support other protocols such as Transmission Control Protocol (TCP)/IP or straight IP packets. Processor 401 stores and accesses data from memory and fetches computer-executable instructions to provide the functionality of security device 400. For example, a message may be received through communications port 405 from a sender. Processor 401 analyzes the message to determine if security measures should be invoked based on the request type and/or sender identification. Processor 401 passes the message to the end device through communications port 407 if security has been validated and if the requested service is supported on the end device itself. Processor 401 subsequently receives a reply message from the end device through communications port 407 and forwards the reply message to the sender.

If the security has not been validated, processor 401 sends a reject message back to the sender through communications port 405. Moreover, if security has been validated but the service is executed on the security device itself (e.g., a SNMP service), processor 401 interacts with the end device in a native protocol to obtain relevant data and incorporates the data into a reply message to the sender.

Although not required, one of ordinary skill in the art will appreciate that various aspects described herein may be embodied as a method, a data processing system, or as a computer-readable medium storing computer-executable instructions. For example, a computer-readable medium storing instructions to cause a processor to perform steps of a method (e.g., process 300 as shown in FIG. 3) in accordance with aspects of the invention is contemplated. Aspects of the method steps disclosed herein may be executed on processor 401. Processor 401 may execute computer-executable instructions stored on a computer-readable medium.

Security device 400 may utilize a variety of computer readable media. Computer readable media may be any available media that may be accessed by security device 400 and include both volatile and nonvolatile media, removable and non-removable media. By way of example, and not limitation, computer readable media may comprise a combination of computer storage media and communication media. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by security device 400.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

I claim:

1. An apparatus comprising:
a first communications port configured to receive an incoming message designated for an end device, wherein an assigned address of the apparatus is equal to an assigned address of the end device;
a second communications port configured to be connected to the end device; and
a processor connected to the first and second communications port and configured to:
determine whether to pass the incoming message to the end device based on at least one security consideration through the second communications port, and if so to pass the message through the second communications port to the end device;
provide at least one service that is not originally supported on the end device;
when the incoming message is associated with the at least one service not originally supported on the end device, exchange data with the end device using a native protocol of the end device;
convert the data to a required protocol; and
return a response to a sender of the incoming message.

2. The apparatus of claim 1, wherein the first communication port complies with an industrial application protocol.

3. The apparatus of claim 1, wherein the processor is configured to determine whether to pass the incoming message based on a sender identification contained in the incoming message.

4. The apparatus of claim 1, wherein the processor is configured to determine whether to pass the incoming message based on a type of request contained in the incoming message.

5. The apparatus of claim 1, wherein the processor is further configured to:
when the incoming message is associated with a first request type, pass the incoming message to the end device.

6. The apparatus of claim 1, wherein the processor is further configured to:
when the incoming message is associated with a second request type, reject the incoming message.

7. The apparatus of claim 1, wherein the processor is further configured to:
when the incoming message is associated with a third request type, challenge a sender of the incoming message.

8. The apparatus of claim 1, wherein the second communications device is configured to be directly connected only to the end device.

9. A method comprising:
receiving, at an apparatus, an incoming message designated for an end device, wherein an assigned address of the apparatus is equal to an assigned address of the end device;
determining whether to pass the incoming message from the apparatus to the end device based on at least one security consideration, and if so, passing the message to the end device;
providing, by the apparatus, at least one service that is not originally supported on the end device;
when the incoming message is associated with the at least one service not originally supported on the end device, exchange data with the end device using a native protocol of the end device;
convert the data to a required protocol; and
return a response to a sender of the incoming message.

10. The method of claim 9, wherein the message complies with an industrial application protocol.

11. The method of claim 9, wherein said determining comprises:
obtaining a sender identification contained in the incoming message; and
determining whether the incoming message should be passed to the end device based on the sender identification.

12. The method of claim 9, wherein said determining comprises:
obtaining a type of request contained in the incoming message; and
determining whether the incoming message should be passed to the end device based on the type of request.

13. The method of claim 9, further comprising:
when the incoming message is associated with a first request type, pass the incoming message to the end device.

14. The method of claim 9, further comprising:
when the incoming message is associated with a second request type, reject the incoming message.

15. The method of claim 9, further comprising:
when the incoming message is associated with a third request type, challenge a sender of the incoming message.

16. A computer-readable non-transitory storage medium storing computer-executable instructions that, when executed, cause a computing device to perform a method comprising:
receiving, at the computing device, an incoming message designated for an end device, wherein an assigned address of the computing device is equal to an assigned address of the end device;
determining whether to pass the incoming message to the end device based on at least one security consideration, and if so, passing the incoming message to the end device;
providing at least one service that is not originally supported on the end device;

when the incoming message is associated with the at least one service not originally supported on the end device, exchanging data with the end device using a native protocol of the end device;

converting the data to a required protocol; and returning a response to a sender of the incoming message.

17. The computer-readable non-transitory storage medium of claim 16, the method further comprising:

obtaining a sender identification contained in the incoming message; and determining whether the incoming message can be passed to the end device based on the sender identification.

18. The computer-readable non-transitory storage medium of claim 16, the method further comprising:

obtaining a type of request contained in the incoming message; and determining whether the incoming message can be passed to the end device based on the type of request.

19. The computer-readable non-transitory storage medium of claim 16, the method further comprising:

when the incoming message is associated with a first request type, pass the incoming message to the end device.

20. The computer-readable non-transitory storage medium of claim 16, the method further comprising:

when the incoming message is associated with a second request type, reject the incoming message.

21. The computer-readable non-transitory storage medium of claim 16, the method further comprising:

when the incoming message is associated with a third request type, challenge a sender of the incoming message.

22. An apparatus, comprising:

a first communications port configured to be coupled to a network and to receive via the network a message addressed to a network address of a device, and further configured to assume the network address of the device;

a second communications port configured to be coupled to the device; and a processor configured to:

determine, based on at least one security consideration, whether to pass the message through the second communications port to the device, if it is determined that the message is to be passed through the second communications port, then determine whether a service associated with the message is supported by the device, if the service is determined to not be supported by the device, then: provide the service by the apparatus via the first communications port, convert data to a native protocol of the device, and exchange the data with the device using the native protocol, and return a response to a sender of the message.

* * * * *